United States Patent [19]

Huret

[11] 4,111,059
[45] Sep. 5, 1978

[54] DEVICE FOR TRANSMITTING MOVEMENT TO A SPEED INDICATOR INSTRUMENT AND/OR A DISTANCE COUNTER

[76] Inventor: Jacques Andre Huret, 12, rue C.B. Metman, Neuilly-sur-Seine, France, 92200

[21] Appl. No.: 771,563

[22] Filed: Feb. 24, 1977

[30] Foreign Application Priority Data

Mar. 19, 1976 [FR] France .................. 76 08071

[51] Int. Cl.² .................. F16H 37/00; G01P 3/00
[52] U.S. Cl. .................. 74/12; 73/529; 74/13
[58] Field of Search .......... 73/490, 529; 74/12, 74/13, 219

[56] References Cited

U.S. PATENT DOCUMENTS

| 555,492 | 3/1896 | Bonney | 73/529 X |
| 806,044 | 11/1905 | Andrews | 73/529 X |
| 1,848,060 | 3/1932 | Gustafson | 74/12 |
| 1,854,018 | 4/1932 | Carlberg | 74/219 |
| 2,200,175 | 5/1940 | Kaestner | 74/219 X |

FOREIGN PATENT DOCUMENTS 160,260   5/1905   Fed. Rep. of Germany ............. 73/529

Primary Examiner—Leonard H. Gerin
Attorney, Agent, or Firm—Weingarten, Maxham & Schurgin

[57] ABSTRACT

Device for transmitting movement to a speed indicator instrument and/or distance counter, particularly for bicyles, comprising a driving wheel driven by a tire of the bicycle and a transmission casing. The transmission casing has an input shaft on which the wheel is mounted, and an output shaft adapted to be connected by a flexible cable to the counter and/or indicator instrument, the input and output shafts being parallel and connected by a transmission system of the wheel and belt type. The input shaft is offset in relation to the median plane of the casing parallel to the input and output shafts in such a manner that the wheel projects only on one side of the casing.

5 Claims, 4 Drawing Figures

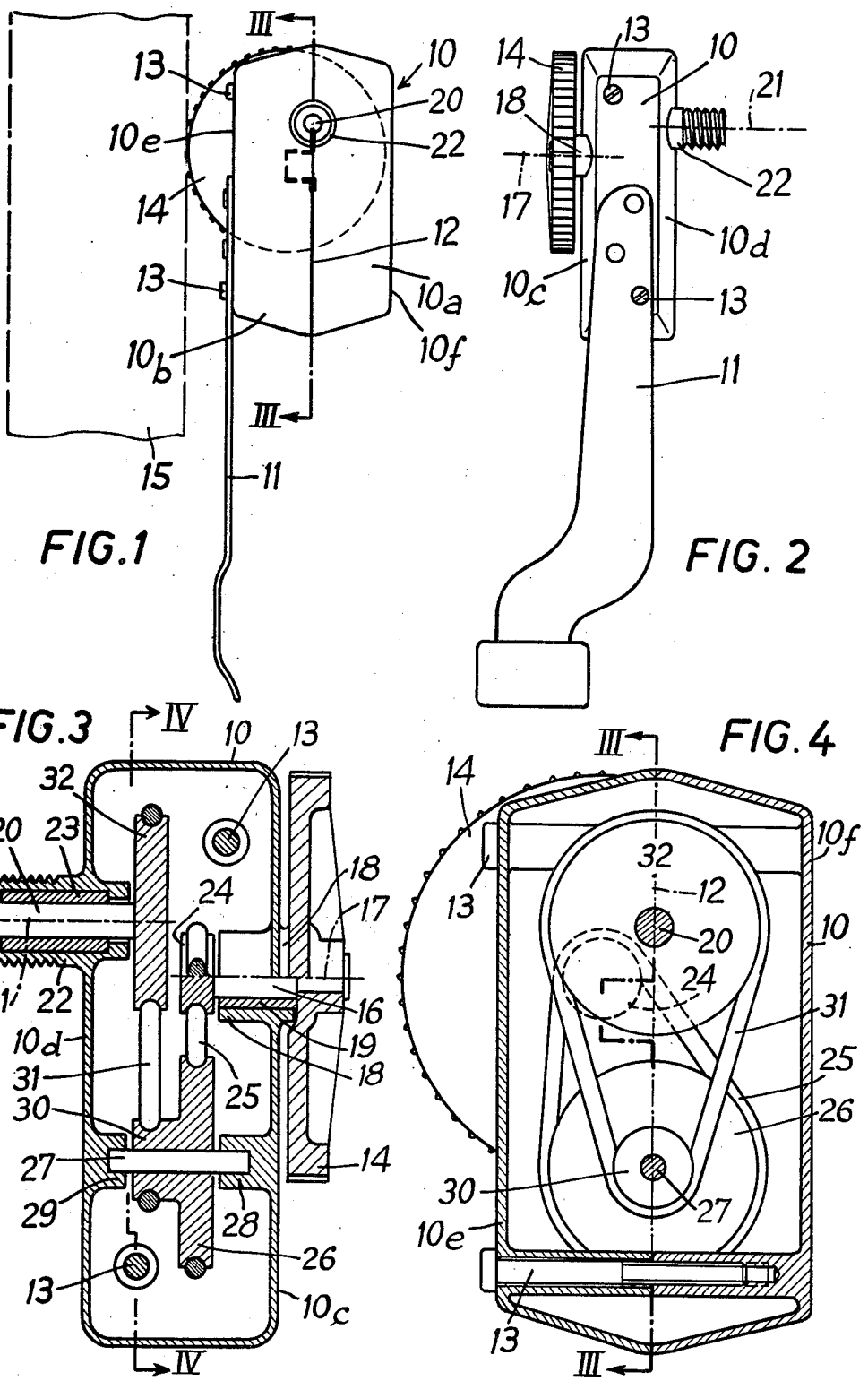

DEVICE FOR TRANSMITTING MOVEMENT TO A SPEED INDICATOR INSTRUMENT AND/OR A DISTANCE COUNTER

The present invention relates to devices for transmitting movement to speed indicator instruments and/or distance counters.

A device of the type comprising a driving wheel adapted to be driven by contact with a type of the bicycle, and a transmission casing which has an input shaft carrying the driving wheel and an output shaft capable of being connected to a speed indicator instrument by a flexible cable, and which contains a mechanical transmission system between the input shaft and the output shaft is known.

In the known device the transmission system is in the form of gears and bevel pinions provided between the input and output shafts which form an obtuse angle to one another.

This known device has various disadvantages. Thus the relative angular arrangement of the input and output shafts complicates the transmission system. Furthermore, transmission of movement by gears and pinions entails the risk of damage if, in the course of the operation of the device, accidental jamming should occur, for example of the flexible cable. Finally, with this known device the driving wheel outside the box is not protected against possible contact with objects fixed to or suspended on the bicycle.

The present invention seeks to provide a device which does not have these disadvantages and which moreover is of simple construction, being adapted to be mounted at the front wheel of the bicycle and making it possible to provide for the flexible cable a rectilinear path of reduced length between the transmission casing and the indicator instrument and/or counter.

According to the present invention, there is provided a device for transmitting movement to a speed indicator instrument and/or distance counter, comprising: a driving wheel adapted to be driven by contact with a type; and a transmission casing which has an input shaft carrying the driving wheel and an output shaft capable of being connected to the said instrument by a flexible cable, the casing containing a mechanical transmission system of the wheel and belt type between the input shaft and the output shaft, the input shaft and the output shaft being parallel and extending from opposite faces of the casing, the input shaft being offset in relation to a median plane of the casing parallel to the input and output shafts in such a manner that the driving wheel projects on one side of the casing.

A device of this kind may be mounted at the front wheel of the vehicle, approximately under the handlebars. The driving wheel is then situated under the bottom face of the casing and projects from the latter only on one side for the purpose of coming into engagement with the side of the front wheel tyre. Thus, this driving wheel is protected by the casing against any possible contact with an object, for example a bag, suspended from the handlebars.

Moreover, the output shaft is then accessible from the upper face of the casing, and if the device is mounted substantially at the level of the top of the front wheel the flexible cable will have a rectilinear path of reduced length for the purpose of connecting the output shaft to the indicator instrument and/or counter mounted on the handlebars.

Finally, the utilisation of a transmission system of the wheel and belt type makes it possible to reduce or prevent damage in the event of jamming at the outlet, because such jamming would result in the slipping of the belt or belts. It will also be noted that a transmission of this kind, comprising a wheel or wheels and belt or belts permits very easy determination of its exact ratio, as compared with a system comprising gear and bevel pinions.

The invention is illustrated, merely by way of example, in the accompanying drawings, in which:

FIG. 1 is a top plan view of one embodiment of a device according to the present invention for transmitting movement to a speed indicator instrument and/or distance counter;

FIG. 2 is a side view of the device shown in FIG. 1;

FIG. 3 is a side view on a larger scale of the device shown in FIGS. 1 and 2, shown in section on line III—III in FIG. 1 or FIG. 4, and FIG. 4 is a top plan view in section on the line IV—IV in FIG. 3

A device according to the present invention and shown in FIGS. 1 to 4 comprises a transmission casing 10 which has substantially the shape of a right parallelepiped. On one side face of the casing 10 is fixed one end of a fastening bracket 11 (shown only in FIGS. 1 and 2), the other end of which may be fixed on the front fork (not shown) of a bicycle. The casing 10 is shown in FIG. 1 viewed from above approximately in its installed position.

The casing 10 is, for example, composed of two parts 10a, 10b, of moulded plastics material, joined at the vertical median plane 12 of the casing 10 by screws 13.

A driving wheel 14 is mounted outside the casing 10, under a bottom face 10c. The wheel 14 is a knurled wheel adapted to be driven rotationally by contact with the side of the front type, diagrammatically indicated at 15, of the bicycle.

The wheel 14 is mounted at the outer end of an input shaft 16 (FIG. 3), whose axis 17 is parallel to the median plane of the casing 10 and is offset in relation to the latter in such a manner that the wheel 14 projects laterally only on a side face 10e of the casing which faces the wheel.

Thus viewed from above, the wheel 14 does not project on a side face 10f of the casing opposite the side face 10e. The casing 10 is mounted under the handlebars, and optionally slightly forward of the latter and approximately at the level of the top part of the front wheel of the bicycle. It is therefore found that the wheel 14 is protected by the casing 10 against any possible contact with an object, for example, a bag, suspended from the handlebars of the bicycle on the side of the front wheel where the casing 10 is mounted.

The input shaft 16 is mounted in a bearing 18 with a ring 19 (FIG. 3) interposed therebetween. The bearing 18 is integrally moulded with the bottom face 10c of the part 10b of the casing 10.

An output shaft 20, whose axis 21 is parallel to the axis 17, is mounted in a bearing 22, a ring 23 being disposed between the output shaft 20 and the bearing 22. The bearing 22 is integrally moulded with a top face 10d of the casing and is, for example, composed of two parts, each formed by one of the parts 10a, 10b of the casing 10.

The outer cylindrical portion of the bearing 22 projecting from the top face 10d of the casing is threaded to receive a sheath of a flexible cable intended to connect the output shaft 20 to a speed indicator instrument and/or distance counter known per se (not shown) which is mounted on the handlebars of the bicycle near their axis.

When the casing 10 is mounted as indicated above, the output shaft 20 is directed substantially towards the handlebars of the bicycle and is near them. The flexible cable will then have a minimum length and a substantially rectilinear path, thereby reducing the possibilities of a transmission failure as far as the flexible cable is concerned.

The input shaft 16 and output shaft 20 are connected mechanically by a transmission system composed of wheels and belts which are housed in the casing 10. This transmission system (FIGS. 3 and 4) comprises a grooved wheel 24 mounted on the inner end of the input shaft 16 and connected by a belt 25 to a groove wheel 26 mounted loose on a shaft 27 parallel to the input shaft 16.

The shaft 27 is held at its end in two recesses 28,29 integrally moulded with the bottom face 10c and the top face 10d of the casing 10. Each recess 28,29 is composed of two parts, each formed in one of the parts 10a, 10b of the casing 10.

A grooved wheel 30 is fixed to the wheel 26 for rotation about the shaft 27 and is connected by a belt 31 to a groove wheel 32 mounted on the inner end of the output shaft 20.

The wheels 26,32 have a diameter greater than that of the wheels 24,30. A transmission system of this kind with double reduction for a relatively high total reduction ratio is compact, thus enabling the casing 10 to have relatively small dimensions. Furthermore, the determination of the transmission ratio of the transmission system of this type is easier than with a transmission system consisting of gears and bevel pinions.

In the illustrated embodiment the output shaft 20 and the shaft 27 have their axes parallel and situated in the median longitudinal plane of the casing 10, thereby simplifying the construction of the casing which is then in the form of two parts joined together in that plane. However, these parallel axes need not necessarily be in the median plane 12 of the casing 10.

The present invention is not limited to its application to bicycles proper but is applicable to light-weight motorcycles, mopeds etc..,

What I claim:

1. An apparatus for transmitting movement from a vehicle wheel to a speed indicating and/or distance counting apparatus for use with a wheeled vehicle such as bicycle, lightweight motorcycle, or the like, said apparatus comprising:
   a transmission casing;
   an input shaft extending through a first face of said casing;
   an output shaft extending through a second face of said casing opposite said first face thereof;
   said input and output shafts being disposed in substantially parallel relationship;
   a mechanical transmission system disposed within said casing for operatively connecting said input shaft to said output shaft, said transmission system being of the wheel and belt type;
   each wheel of said transmission system having an axis of rotation parallel to said input and output shafts;
   said output shaft being adapted to be connected to a flexible cable for driving said speed indicating and/or distance counting apparatus; and
   a driving wheel attached to said input shaft on a portion thereof extending outside said casing;
   said input shaft being offset in relation to a median plane of said casing parallel to said input and output shafts, whereby said driving wheel projects beyond a portion of the casing on one side thereof but not on an opposite side thereof;
   said driving wheel being adapted to be driven by contact with a portion of the surface of a front tire or wheel of the vehicle, on the side of said casing from which it projects.

2. A device as claimed in claim 1 in which the axis of the output shaft is situated in the median plane of the casing.

3. A device as claimed in claim 1 in which the transmission system comprises a first and a second grooved wheel which are mounted respectively on the input shaft and the output shaft and are coupled respectively by a belt to third and fourth grooved wheels which are mounted for rotation as a unit about an axis parallel to the input and output shafts.

4. A device as claimed in claim 3 in which the axis of rotation of the third and fourth grooved wheels and that of the output shaft are in the longitudinal median plane of the casing.

5. A device as claimed in claim 1 in which the casing has substantially the shape of a right parallelepiped.

* * * * *

UNITED STATES PATENT AND TRADEMARK OFFICE
CERTIFICATE OF CORRECTION

PATENT NO. : 4,111,059
DATED : September 5, 1978
INVENTOR(S) : Jacques Andre Huret It is certified that error appears in the above–identified patent and that said Letters Patent are hereby corrected as shown below:

Column 1, line 10, "type" should read --tyre--;
         line 41, "type" should read --tyre--.

Signed and Sealed this

First Day of May 1979

[SEAL]

Attest:

RUTH C. MASON
Attesting Officer

DONALD W. BANNER
Commissioner of Patents and Trademarks